United States Patent
Snodgrass et al.

(10) Patent No.: US 6,442,543 B1
(45) Date of Patent: Aug. 27, 2002

(54) METHOD AND APPARATUS FOR CHANGING TEMPORAL DATABASE INFORMATION

(75) Inventors: Richard T Snodgrass, Tucson, AZ (US); John Bair, Superior, CO (US)

(73) Assignee: Amazon.com, Inc., Seattle, WA (US)

( * ) Notice: Subject to any disclaimer, the term of this patent is extended or adjusted under 35 U.S.C. 154(b) by 44 days.

(21) Appl. No.: 09/740,495

(22) Filed: Dec. 18, 2000

Related U.S. Application Data

(63) Continuation-in-part of application No. 09/304,697, filed on May 4, 1999, now Pat. No. 6,185,556, which is a continuation-in-part of application No. 08/900,181, filed on Jul. 25, 1997, now Pat. No. 5,999,924.

(51) Int. Cl.$^7$ .............................................. G06F 17/30
(52) U.S. Cl. ...................... 707/3; 707/2; 707/4; 707/5; 707/9; 707/102; 707/203; 711/110
(58) Field of Search ................................ 707/2–5, 102, 707/3, 4, 104.1, 203, 9, 1, 201, 10; 711/110

(56) References Cited

U.S. PATENT DOCUMENTS

| | | | |
|---|---|---|---|
| 4,748,439 A | * 5/1988 | Robinson et al. | 340/146.2 |
| 4,924,435 A | * 5/1990 | Brunvand et al. | 711/110 |
| 4,956,774 A | * 9/1990 | Shibamiya et al. | 707/2 |
| 5,265,065 A | * 11/1993 | Turtle | 707/4 |
| 5,317,733 A | 5/1994 | Murdock | 707/203 |
| 5,347,653 A | 9/1994 | Flynn et al. | 707/203 |
| 5,418,948 A | * 5/1995 | Turtle | 707/4 |
| 5,428,774 A | 6/1995 | Takahashi et al. | 707/101 |
| 5,440,730 A | 8/1995 | Elmasri et al. | 707/203 |
| 5,495,606 A | * 2/1996 | Borden et al. | 707/3 |
| 5,548,754 A | 8/1996 | Pirahesh et al. | 707/2 |
| 5,551,031 A | 8/1996 | Cheng et al. | 707/2 |
| 5,557,791 A | 9/1996 | Cheng et al. | 707/2 |
| 5,572,731 A | 11/1996 | Morel et al. | |
| 5,574,900 A | * 11/1996 | Huang et al. | 707/1 |
| 5,590,324 A | 12/1996 | Leung et al. | 707/5 |
| 5,600,831 A | * 2/1997 | Levy et al. | 706/45 |
| 5,603,021 A | 2/1997 | Spencer et al. | 707/4 |

(List continued on next page.)

OTHER PUBLICATIONS

Elmasri, Rames et al., "A Temporal Model and Query Language For ER Databases", Proceedings of the Sixth International Conference on Data Engineering, Feb. 5–9, 1990, pp. 76–83.*

(List continued on next page.)

*Primary Examiner*—Jean M. Corrielus
*Assistant Examiner*—Shahid Alam
(74) *Attorney, Agent, or Firm*—Perkins Coie LLP

(57) ABSTRACT

A method and apparatus accepts a query to update or delete rows in a temporal table of a database. The query may describe which rows are to be updated, a calculation for the value to be used to update each row of the table, and a period of validity, during which the changes are to take place. The method and apparatus creates a sequence of queries and SQL program elements that together can make up an SQL program that will execute the query received. The SQL program can split any row of the table to be updated into multiple rows so that each of the multiple rows of the table to be changed have an effective period during which no changes occur in the table to be changed or any other tables referenced in the query received and no effective periods span the beginning or the end of the period of validity. The specified change may then be made to the resulting rows, and rows that are adjacent in time with identical values may be collapsed into a single row. The result is inserted into the table to be changed and the corresponding original rows in the table to be changed are deleted. The method and apparatus operates for queries received to update or delete a table.

8 Claims, 5 Drawing Sheets

U.S. PATENT DOCUMENTS

| | | | | |
|---|---|---|---|---|
| 5,706,495 | A | * | 1/1998 | Chadha et al. .................. 707/2 |
| 5,710,916 | A | * | 1/1998 | Barbara et al. ................. 707/3 |
| 5,745,899 | A | * | 4/1998 | Burrows ...................... 707/10 |
| 5,819,286 | A | * | 10/1998 | Yang et al. .................... 707/1 |
| 5,926,816 | A | * | 7/1999 | Bauer et al. ................ 707/201 |
| 5,950,210 | A | * | 9/1999 | Nelson .......................... 707/1 |
| 6,324,535 | B1 | * | 11/2001 | Bair et al. .................. 345/419 |

OTHER PUBLICATIONS

Ng, Wilfred et al., "An Extension of SQL to Support Ordered Domains in Relational Databases", Proceedings of the International Database Engineering and Applications Symposium, IDEAS '97, Aug. 25–27, 1997, pp. 358–367.*

Son, Daeweon et al., "Efficient Temporal Join Processing Using Time Index", Proceedings of the Eighth International Conference on Scientific and Statistical Database Systems, Jun. 18–20, 1996, pp. 252–261.*

Elmasri, R.A. and S.B. Navathe, Fundamentals of Database Systems, 1989, pp. 649–650, Benjamin/Cummings Publishing Company, Inc., Redwood City, California, USA.

Snodgrass, R.T., The Temporal Query Language TQuel, ACM Transactions on Database Systems, Jun. 1987, pp. 247–298, vol. 12, No. 2, Association for Computing Machinery, New York, New York, USA.

Snodgrass, R.T., S. Gomez and L.E. McKenzie, Jr., Aggregates in the Temporal Query Language TQuel, IEEE Transactions on Knowledge and Data Engineering, Oct. 1993, pp. 826–842, vol. 5, No. 5, Institute of Electrical and Electronics Engineers, New York, New York.

Snodgrass R. T. (ed.), The TSQL2 Temporal Query Language, 1995, pp. 1–631, Kluwer Academic Publishers, Boston, Massachusetts, USA.

Snodgrass, R.T., M.H. Boehlen, C.S. Jensen and A. Steiner, Adding Valid Time to SQL/Temporal, ANSI X3H2–96–501r2, ISO/IEC JTC1/SC21/WG3 DBL MAD–146r2, Nov. 1996, pp. 1–77, International Organization for Standardization, Geneva, Switzerland.

Tansel, A., J. Clifford, S. Gadia, S. Jajodia, A. Segev and R.T. Snodgrass, Temporal Databases: Theory, Design, and Implementation, 1993, pp. 1–593, Benjamin/Cummings Publishing Company, Inc., Redwood City, California, USA.

Melton, J, Temporal (SQL/Temporal) ANSI TC X3H2 ISO/IEC JTC 21/WG 3 Database, Apr. 1997, pp. 1–65 plus notes 1–21 and index 1–3, International Organization for Standardization Geneva, Switzerland.

Bair, J., M. H. Boehlen, C. S. Jensen, and R. T. Snodgrass, Notions of Upward Compatibility of Temporal Query Languages, Sep. 1996, pp. 1–22, Aalborg University, Aalborg, Denmark.

* cited by examiner

METHOD AND APPARATUS FOR CHANGING TEMPORAL DATABASE INFORMATION

CROSS REFERENCE TO RELATED APPLICATIONS

The subject matter of this application is related to, and is a continuation-in-part-of, the subject matter of application Ser. No. 09/304,697 entitled, "METHOD AND APPARATUS FOR CHANGING TEMPORAL DATABASE INFORMATION" filed on May 4, 1999 now U.S. Pat. No. 6,185,556 by John Bair and Richard Snodgrass, which is a continuation in part of application Ser. No. 08/900,181 filed Jul. 25, 1997 entitled, "METHOD AND APPARATUS FOR PRODUCING SEQUENCED QUERIES" issued as U.S. Pat. No. 5,999,924 on Dec. 7, 1999 to John Bair and Richard Snodgrass, each having the same assignee as this application and each is incorporated herein by reference in its entirety.

FIELD OF THE INVENTION

The present invention is related to computer software and more specifically to computer database software.

BACKGROUND OF THE INVENTION

A collection of information is a database. Some databases logically organize data in a specific way. Data may be stored in tables, with each table containing one or more rows and one or more columns. Each column stores a particular type of data and the columns of each row are logically related. For example, an employee database may have information in each row related to a particular employee, with each row containing three columns. One column may hold social security numbers, another column may hold names and the third column may hold the grade of the employee. Thus, each row contains each of the three pieces of information for each employee.

In some cases, databases use multiple tables. For example, to track personnel records in a company, the table of employee information described above may be used in conjunction with a different table containing information about available positions. A third table relates the first two tables, describing the position each employee holds. For example, a company may have two managers and five other employees having the position of line employee. There are a total of seven employees in the employee table, and two positions in the position table: manager and line employee. A third table can relate each of the seven employees to one of the two available positions.

As information stored in the database changes, some databases replace the outdated information with the most up-to-date information. In such databases, outdated information may be lost forever once replaced. For example, if an employee is promoted to manager, the third table that relates employees to positions can be changed to show the employee in the new position, replacing any evidence in the table that the employee was ever a line employee.

Other databases are temporal databases, which can retain outdated information along with the up-to-date information. The outdated information is stored in a different row from the current information. For example, the table that relates employees to positions may have seven rows before the promotion, one for each employee. When the promotion occurs, a new eighth row is added relating the employee to the new position while retaining the row that also relates the employee to his or her old position.

The information in one or more tables of a temporal database has one or more date columns to identify the period the information in a particular row is or was valid. For example, the table relating employees to positions may have two date columns, a start date and an stop date for the row. When the employee is promoted to manager, the row relating the employee to a line-employee position has the start date as the hire date of the employee. The day he or she is promoted is inserted into the stop date, and a new row is added in the table relating employees to positions which contains an identifier of the employee and an identifier of the manager position. In addition, the start date contains the date of the employees first day as a manager. Because the table relating employees to positions now has two rows for the promoted employee, the table may be used to retrieve historical information, such as how many line employees the company had before the date of the employee's promotion to manager.

Information may be retrieved from a database using a query. A query is any command that retrieves information from a database. Some commercially available database products such as the Oracle8 database product commercially available from Oracle Corporation of Redwood Shores, Calif. interpret queries that conform to a standard query language called Structured Query Language, or SQL. Each database product may also allow certain variations from the SQL standard. To retrieve information from a database that implements SQL queries, a user of the database provides a query containing a "select" command and a description of the data the user desires to retrieve. The database product retrieves from the tables specified in the query the specified data for the user.

Queries may also be used to change information in a database. The user can provide a query containing an update command, a criteria for the data to be updated and a description of how the data to be updated is to be changed. The database program retrieves the specified data, changes it, and stores it back into the database. Other queries can insert or delete data in one or more tables.

SQL commands to change a database make data manipulation simpler for the user than it might otherwise be. However, SQL commands to change data in a temporal database can be much more complex to structure than queries for non-temporal databases because the data in temporal databases changes over time. A conventional SQL update command may not work properly because a conventional SQL update command assumes the data in all tables is static over time. However, commands to change a temporal database ordinarily need to take the time-varying nature of the data into account.

To update with a new value or values in a set of rows in a table that meet a specified criteria that are applicable during a particular period may not be possible using a conventional SQL command for several reasons. A single row may only meet the specified criteria for part of the time the row is applicable. The particular period may start or stop between the start date and stop date of one or more rows, causing a portion of any row to be within the particular period and another portion of the same row to be outside of the particular period. The new value specified may be undefined over some portion of the time one or more rows are applicable.

Although performing an update for a non-temporal database can often be performed using a single SQL update command, updating data in temporal databases is more complex for the reasons described above. It is not possible to provide a single SQL update command that appropriately deals with the special cases above. The task is sufficiently complex that a typical end user cannot perform it using even a few SQL commands. In many cases, a programmer is required to create an SQL program that can handle the complexity required to perform the update properly for the reasons described above. What is needed is a method and apparatus that can accept for a temporal database a command similar to an SQL update command for a non-temporal database, and cause the temporal database to be updated as specified in the command.

SUMMARY OF THE INVENTION

A method and apparatus temporally updates one or more tables according to a command that can be similar to a conventional SQL "UPDATE" command, that specifies a period of validity, specifies criteria for the table to be updated and specifies the update values with which to update the table. The command is intercepted by the method and apparatus and one or more queries and SQL program elements are substituted in place of the command. The queries and SQL program elements will, when submitted to a conventional database product, perform the command. The user need only generate a single SQL command, and is therefore freed from dealing with the complexity of converting a temporal command into the series of conventional queries and SQL program elements that would otherwise be required. The queries will identify periods of constant data over the period of applicability in either the table to be updated or the tables used to calculate the values that will be used to update the table, or both. The SQL program elements will use the result of the queries to potentially split each row in the table to be updated that is within the period of applicability into multiple rows if the row in the table to be updated spans more than one of the constant periods. Because during the effective dates of each of the resulting rows of the table to be changed, the values of the table to be changed and the values of any tables used to calculate changed values will be static, conventional SQL program elements may be used to change the values of the table to be changed. These program elements are generated, and the queries and all SQL program elements may be submitted to a conventional database product to change the values according to the command received. The method and apparatus also intercepts other commands to change a temporal database, such as those similar to conventional SQL "DELETE" and "INSERT" commands, and generates conventional SQL commands to perform delete and insert functions using a subset of the techniques used to perform updates described above.

DETAILED DESCRIPTION OF A PREFERRED EMBODIMENT

Figure 1:
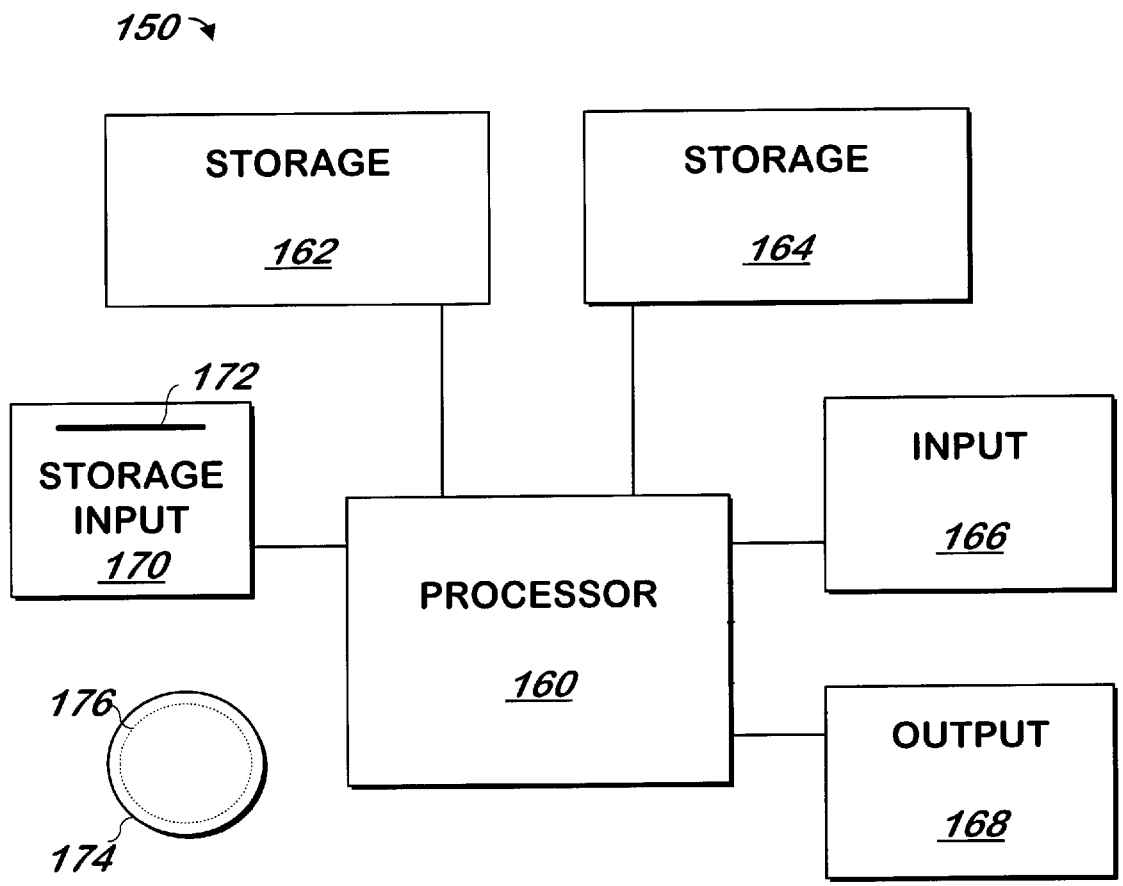
FIG. 1 is a block schematic diagram of a conventional computer system.

The present invention may be implemented as computer software on any number of conventional computer systems in intercommunication, for example using a local area network. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other non-volatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, any number of computer systems 150 may be used to implement the present invention. In one embodiment, each computer system 150 is a conventional Sun Microsystems Ultra 1 Creator computer system running the Solaris 2.5.1 operating system commercially available from Sun Microsystems of Mountain View, Calif., although other systems may be used.

Figure 2:
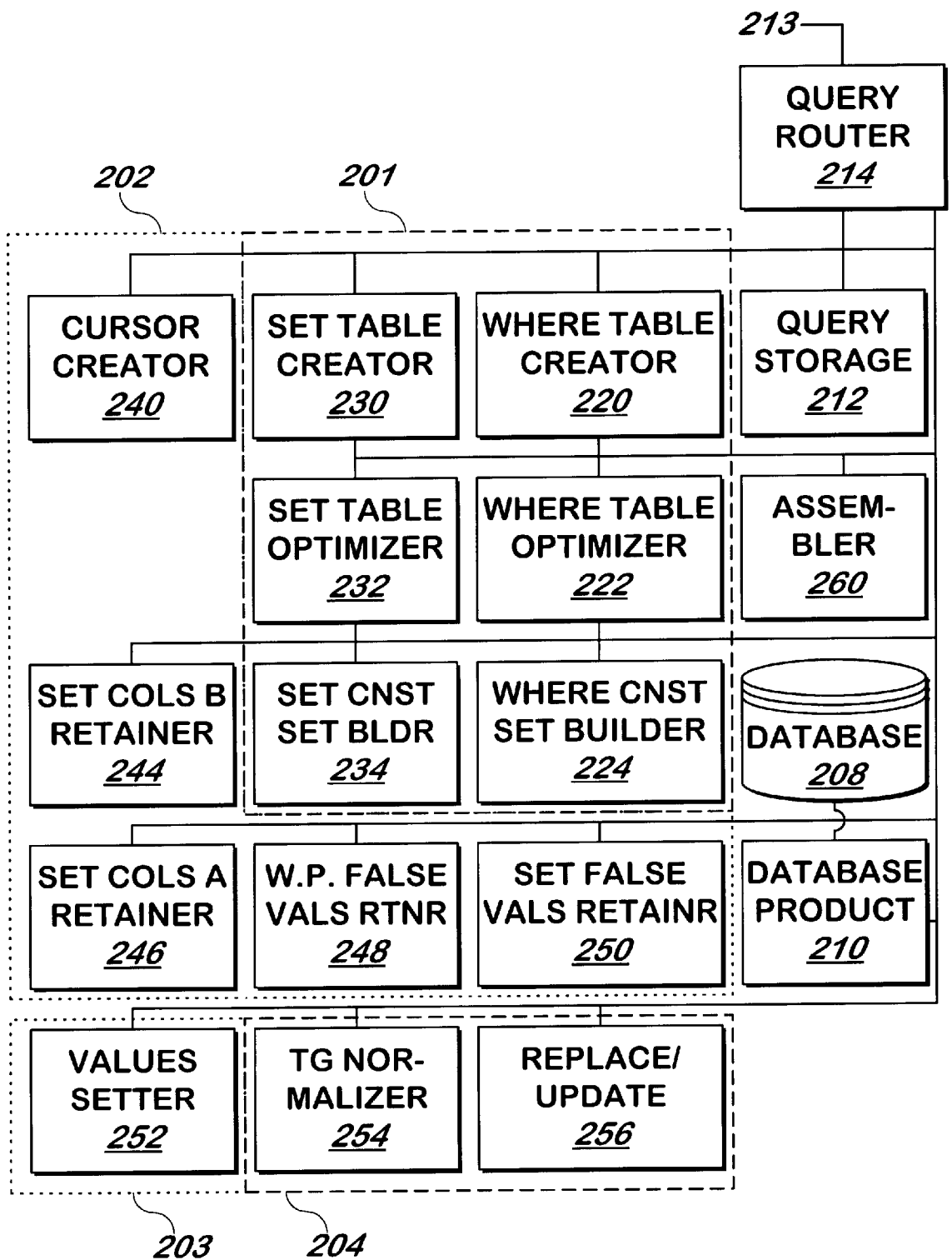
FIG. 2 is a block schematic diagram of an apparatus for intercepting a command to change a temporal database and substituting a series of queries and SQL program elements that, when executed by a conventional database product, will perform the command according to one embodiment of the present invention.

Referring now to FIG. 2, an apparatus for converting queries that are intended to change data in the database into queries capable of execution by a conventional database product 210 is shown according to one embodiment of the present invention. The database product 210 is any conventional database product that can change data in a database such as the conventional Oracle8 product commercially available from Oracle Corporation of Redwood Shores, Calif. In one embodiment, the present invention intercepts queries and commands intended for a conventional database product 210 that can execute queries, and provides only the queries and program statements described below in place of the query or command it receives, and in another embodiment, the present invention is integrated with such database product 210. Database product 210 stores the data in the database in database storage 208, which is any storage device such as disk or memory.

A. Receipt and Routing of the Query

In one embodiment, a query router 214 receives the query and identifies if it should be processed by the present invention by looking at the type of table on which the query will operate and the command in the query as described below. If the type of the table is temporal and the command in the query is an update, insert or delete command, query router 214 sends the query to query storage 212 and sends all other types of queries to database product 210. In another embodiment, query router 214 routes certain types of other queries to other apparati. For example, queries that select data from temporal tables may be routed by query router 214 to the apparatus described in copending application "METHOD AND APPARATUS FOR PRODUCING SEQUENCED QUERIES", Ser. No. 08/900,181.

Query storage 212 stores the query received from query router 214. The query may take any form. One example of a query that will be used for example purposes herein is as follows, however the present invention operates with any type and format of query:

VALIDTIME PERIOD '[01-JAN-96 -01-JAN-97)'
  UPDATE Incumbents I
SET PCN= (SELECT PCN FROM Positions P
  WHERE P.JTC= 'C' AND P.D= I.D)
WHERE SSN IN (SELECT SSN FROM Employees E
  WHERE B= 'B' AND E.G= I.G); (Query 1)

Query 1 contains four portions. The first portion "VALIDTIME PERIOD '[01-JAN-96 -01-JAN-97)'" describes the time period over which the query is to operate, and is referred to as the "period of applicability" of the query received by query router 214 at input 213. The square bracket to the left of the first date signifies the period starts at the beginning of Jan. 1, 1996 and the curved bracket or parenthesis to the right of the second date signifies that the period ends at the end of the day before Jan. 1, 1997. Either type of bracket may be used in either position according to the present invention, with the appropriate modifications to the techniques described herein, such as is described in the parent application.

As used herein, dates are used to define periods, although any other indication of time may also be used.

The second portion of Query 1 is the command "UPDATE Incumbents I" which provides instructions to make changes to the table named "Incumbents" and save the changes back into the Incumbents table. The Incumbents table is the temporal table described above that relates employees to positions and contains effective dates of those relationships.

The third portion of Query 1 is the "SET" clause, "SET PCN=(SELECT PCN FROM Positions P WHERE P.JTC= 'C' AND P.D=I.D)", describing how to change the Incumbents table. It states that the position category of the Incumbents table is to be changed to the corresponding row of a single column table constructed using the select clause to the right of the equals sign.

The fourth portion of Query 1 is the "WHERE" clause, "WHERE SSN IN (SELECT SSN FROM Employees E WHERE B='B' AND E.G=I.G)", describing which rows of the Incumbents table are to be updated. Only those rows of the Incumbents table having a social security number in the set of social security numbers for employees having a name of 'B' and a grade equal to the grade of the current row of the Incumbents table are updated.

When query router 214 passes the query to query storage 212, query router 214 signals the where table creator 220, where table optimizer 222, where constant set builder 224, set table creator 230, set table optimizer 232, set constant set builder 234, cursor creator 240, set columns before retainer 244, set columns after retainer 246, where predicate false values retainer 248, set false values retainer 250, values setter 252, Tg normalizer 254 and replace/update 256, each described in more detail below. The where table creator 220, where table optimizer 222, where constant set builder 224, set table creator 230, set table optimizer 232, set constant set builder 234, cursor creator 240, set columns before retainer 244, set columns after retainer 246, where predicate false values retainer 248, set false values retainer 250, values setter 252, Tg normalizer 254 and replace/update 256, each creates a portion of an SQL program that, when executed by database product 210 using data stored in a database 208, will cause database product 210 to perform the update indicated in the UPDATE statement or other type of command received.

B. Four Basic Components

The apparatus of the present invention includes four basic components. The first component 201 builds queries that, when executed by database product 210, will generate temporary tables to allow other components of the apparatus of the present invention to operate efficiently. The second component 202 provides code referred to as SQL program elements that, when executed by database product 210, will build a temporary table to hold values of the table that do not correspond to the criteria specified above and are therefore not to be updated. The temporary table built has rows corresponding to the rows of the table to be updated that are at least partially within the period of applicability of the temporal update statement. However, the SQL program elements executed build the temporary table in such a manner that each row of the table to be updated can correspond to multiple rows in the temporary table. The second component 202 of the present invention converts rows of the table to be updated into multiple rows in the temporary table corresponding to: 1) any portion of the effective period of the row that is outside the period of applicability of the update statement, 2) portions of the effective period of the row during which the WHERE clause of the temporal update statement is false and 3) portions of the effective period of the row during which the WHERE clause of the temporal update statement is true but the SET clause has no value. In the rows of the temporary tables corresponding to each of these portions, no new values are set by the apparatus of the present invention, and the rows in the temporary table have all the values (except the StartDate and StopDate) they had of the row prior to execution of the temporal update statement. A third component 203 of the apparatus of the present invention creates SQL program elements that will create any additional rows in the temporary table corresponding to periods of the original row in the table to be updated not covered by periods 1–3 above, calculate the values to set according to the temporal update statement and set the columns of each of these remaining rows to the values. The fourth component 204 of the present invention collapses rows in the temporary table with adjacent rows that have identical values in each column except for the StartDate and StopDate, and inserts the collapsed temporary table into the table to be updated in place of the row corresponding to the row or rows inserted.

C. Building of the Table of Dates from the WHERE Clause

When the where table creator 220 receives the signal from query router 214, the where table creator 220 creates a query that will produce a table containing a list of effective dates for each row in the table to be updated as well as any other table referenced in the fourth portion (the WHERE clause) of the query stored in query storage 212. In one embodiment, the where table creator 220 receives, for example in response to a request it provides to query storage 212, the first, second and fourth portions of the query stored in query storage 212.

The where table creator 220 builds one or more queries to create the list of dates. A temporary table Ta is defined in the query built by the where table creator 220 to store the list described in more detail below.

The where table creator 220 builds one or more queries that will cause all StartDates and StopDates within the period of applicability to be placed in a temporary table referred to as Ta. In one embodiment, the where table creator 220 builds the one or more queries in stages as described below.

In response to Query 1, the where table creator 220 builds the following query to create the table Ta and populate it with StartDates from the table being updated in the query stored in query storage 212 provided the StartDates are within the period of applicability:

CREATE TABLE Ta
UNRECOVERABLE AS SELECT StartDate AS This
    FROM Incumbents I
WHERE SSN IN (SELECT SSN FROM Employees E
    WHERE B='B' AND E.G=I.G
      AND E.StartDate < I.StopDate
      AND I.StartDate < E.StopDate)
    AND '01-JAN-96' < I.StartDate AND I.StartDate < '01-JAN-97'; (Query 2a)

Query 2a references StartDates and StopDates. In one embodiment, it is assumed that every row in every table referenced in the query stored in query storage 212 contains two columns, a StartDate column containing the start date of the row, and a StopDate column, containing the stop date of the row. The data in the row is assumed valid between the StartDate and the StopDate of the row as described above. This is the effective period for the row.

As used herein, a query can include conventional query commands as well as other SQL commands or statements. SQL is explained in Harrington, *SQL Clearly Explained,* (AP Professional 1998), ISBN 0-12-326426-X.

The where table creator 220 reads the query in query storage 212 and builds the query such as Query 2a as follows: The first line is provided as shown above in Query 2a. The second line is provided as shown in Query 2a, with the name and alias of the table to be updated in the first portion of the query stored in query storage 212 substituted in place of "Incumbents I". The word "WHERE" is inserted at the start of line 3, and the criteria of the WHERE clause in lines 3–4 is copied from the fourth portion of the query stored in query storage 212. Additional limitations are added to the limitations of the fourth portion of the query stored in query storage 212. If the limitation in the query stored in query storage 212 is a set operation such as "IN", the additional limitations added go inside the set operation as shown. Those limitations provide that the StartDate of the rows selected from all tables referenced in the fourth portion of the query are before the StopDate of the current row of the table being updated in the query stored in query storage 212, and that the StopDate of the rows selected from the tables referenced in such fourth portion are after the StartDate of the current row of the table being updated in the query stored in query storage 212.

Next, the where table creator 220 adds a limitation to the WHERE clause it creates to match the first portion of the query stored in query storage 212. If there is no such portion specified, an unlimited period of validity is assumed in the query and the where table creator 220 does not add the limitation to the WHERE clause (and similar limitations described below are also not added). In the example query of Query 1, the limitation "AND '01-JAN-96' < I.StartDate AND I.StartDate < '01-JAN-97'" is added to match the first portion of Query 1 to enforce the period of applicability specified in Query 1.

In one embodiment, specifying table Ta as UNRECOVERABLE causes the table to be created as a local table, stored on the client rather than the server in a client-server system. However, it is not strictly necessary and the keyword 'UNRECOVERABLE' may be omitted. Other queries described below may also use the UNRECOVERABLE keyword in the same manner to cause tables to be generated locally.

The where table creator 220 adds the StopDates within the period of applicability from the table to be updated to temporary table Ta by appending to Query 2a an additional query described below. For Query 1, the additional query appended is the following query:

INSERT INTO Ta
SELECT StopDate FROM Incumbents I
WHERE SSN IN (SELECT SSN FROM Employees E
    WHERE B='B' AND E.G=I.G
      AND E.StartDate < I.StopDate
      AND I.StartDate < E.StopDate)
    AND '01-JAN-96' < I.StopDate AND I.StopDate < '01-JAN-97'; (Query 2b)

Query 2b is built by the where table creator 220 in the same manner as Query 2a described above, specifying selection of StopDates instead of StartDates. If only StartDates are used in the table to be updated in the query stored in query storage 212, StopDates may be calculated by identifying the day of the next StartDate, if such next StartDate exists. If only StopDates are used, the StartDate may be calculated as the day of the preceding StopDate, if such date exists.

Next, the where table creator 220 adds a query that causes to be inserted into table Ta the start and stop dates for any other tables referenced in the WHERE clause of the original query stored in table storage 212. The where table creator 220 provides this query which selects the StartDate from any referenced table, using only the portions of the WHERE clause in the fourth portion of the query stored in query storage 212 that concern one table that does not involve the table to be changed and adding in the period of applicability limitation to the where clause from the first portion of the query stored in query storage 212 as described above with reference to Query 2b. For Query 1, that query is:

INSERT INTO Ta
SELECT StartDate FROM Employees E
WHERE B='B'
    AND '01-JAN-96' < E.StartDate AND E.StartDate < '01-JAN-97'; (Query 2c)

Stop dates are also added to the table Ta by executing the query created by where table creator 220, which uses the same approach as Query 2c described above with the additional date limitation in the last line similar to that of query 2b described above:

INSERT INTO Ta
SELECT StopDate FROM Employees E
WHERE B='B'
    AND '01-JAN-96' < E.StopDate AND E.StopDate < '01-JAN-97'; (Query 2d)

Had additional tables been referenced in the where clause, the where table creator 220 would build additional queries similar to Queries 2c and 2d using the technique described above or the additional queries can be combined into a smaller number of queries.

Finally, the where table creator 220 creates additional statements that, when executed by database product 210, will insert into table Ta the endpoints of the period of applicability from the first portion of the original query:

INSERT INTO Ta VALUES ('01-JAN-96') (Query 2e)
INSERT INTO Ta VALUES ('01-JAN-97') (Query 2f)

In another embodiment, to create the queries created by where table creator 220, in place of a SELECT followed by multiple INSERTS, a single query using multiple UNION SELECTS having the WHERE criteria described above are used by where table creator 220. Union selects eliminate any duplicate values from the table Ta.

Where table creator 220 provides the queries it builds to assembler 260, described below.

If union selects are not used, a where table optimizer 222 may optionally be employed to eliminate duplicate entries from table Ta. The where table optimizer 222 generates the following query in response to the signal from query router 214:

CREATE TABLE Ta2 (This DATE);
INSERT INTO Ta2
 SELECT DISTINCT * FROM Ta; (Query 3a)

In the embodiments in which the where table optimizer 222 is used, the operation of the apparatus of the present invention may be more efficient because the query generated by where table optimizer 222 not only eliminates duplicate entries, but may also sort the entries. The where table optimizer 222 provides the query it builds to assembler 260. Although the description below assumes that the where table optimizer 222 is employed, if it is not employed, references to Ta2 may be replaced with Ta.

A where constant set builder 224 builds the following query that, when executed by database product 210, will create a table of StartDates and StopDates from table Ta2 that define a constant set in response to the signal from query router 214. A "constant set" is a table containing rows, with each row containing a StartDate and a StopDate, between which all of the tables referenced in the WHERE clause of the query stored in query storage 212 do not contain changes. The where constant set builder 224 builds the following query:

CREATE TABLE Tb (StartDate DATE, StopDate DATE);
INSERT INTO Tb
SELECT T1.This, T2.This
FROM Ta2 T1, Ta2 T2
WHERE T1.This < T2.This
 AND NOT EXISTS (SELECT * FROM Ta2 T3
  WHERE T1.This < T3.This AND
T3.This < T2.This) (Query 3b)

Where constant set builder 224 passes the Query 3b to assembler 260.

D. Building the table of Dates from the Set Clause.

When signaled by query router 214, set table creator 230 creates queries that, when executed by database product 20 210, will generate a table of dates that include certain StartDates and StopDates from the tables referenced in the third portion of the query stored in query storage 212, the SET clause. The StartDates in the table that set table creator 230 creates are those corresponding to rows in each able referenced in the set clause of the query stored in query storage 212 that meet the first two of the following criteria and optionally meets the third of the following criteria:

1. The row meets all of the criteria for the table in the SET clause of the query stored in query storage 212 that are independent of the table being updated;

2. The row has start dates that are within in the period of applicability;

3. At least one row in the table being updated meets the following criteria: of the rows in the other tables referenced in the WHERE clause of the query stored in query storage 212 that meet the criteria of the WHERE clause in the query stored in query storage 212, the StartDate of the row in the referenced table is less than or equal to the StopDate of the row in the table being updated, and the StartDate of the row of the table being updated is less than or equal to the StopDate of the row of the referenced table.

The third criteria can sometimes reduce the size of the table built by set table creator 230. Therefore, its use is optional to enhance performance of the apparatus shown in FIG. 2.

Using the example of Query 1, set table creator 230 builds the following query:
CREATE TABLE Td
UNRECOVERABLE AS SELECT StartDate AS This
 FROM Positions P
WHERE P.JTC='C'
 AND '01-JAN-96' < StartDate AND StartDate < '01-JAN-97'
 AND EXISTS (SELECT * FROM Incumbents I
  WHERE SSN IN (SELECT SSN FROM Employees E
   WHERE B='B'
   AND E.G=I.G
   AND E.StartDate <=I.StopDate
   AND I.StartDate <=E.StopDate));
  (Query 4a)

In response to the signal from query router 214, set table creator 230 reads the query stored in query storage 212 and creates the query above as follows. First, it provides line 1 as shown above in Query 4a, and substitutes the name and alias of a table referenced in the third portion of the query stored in query storage 212. Line three contains all conditions of the third portion of the query stored in query storage 212 that are independent of the table to be updated in the query stored in query storage 212. Line 4 is provided with the word "AND" and the second portion of the query stored in query storage 212, the period of applicability. Optional Line 5 is provided as shown above, with the name and alias of the table to be updated from the query stored in query storage 212 substituted for "Incumbents I". Line 5 can reduce the size of table Td, described below. Lines 6 through 8 are provided from the fourth portion of the query stored in query storage 212. Lines 9 and 10 added before the close parenthesis, ")". Lines 9 and 10 are provided as shown with the alias of the table referenced in the fourth portion of the query stored in query storage 212 in place of "E" and the alias or name of the table to be updated in the query stored in query storage 212 substituted in place of "I".

Set table creator 230 generates a query that, when executed by database product 210 will add StopDates to table Td using criteria 1 above and criteria 2 (with the requirement that the StopDate be within the period of applicability instead of the StartDate within the period of applicability) and optionally, criteria 3 above to produce the following Query:
INSERT INTO Td
SELECT StopDate FROM Positions P
WHERE P.JTC='C'
 AND '01-JAN-96' < StopDate AND StopDate < '01-JAN-97'
 AND EXISTS (SELECT * FROM Incumbents I
  WHERE SSN IN (SELECT SSN FROM Employees E
   WHERE B='B'
   AND E.G=I.G AND E.StartDate < I.StopDate AND
    I.StartDate < E.StopDate));

(Query 4b)

Set table creator 230 creates this query as described above with respect to Query 4a, with line 1 provided as shown and the selection of the StopDate in line 2 in place of the StartDate of Query 4a (and the omission of the optional "UNRECOVERABLE" keyword).

If additional tables are referenced in the SET clause, the third portion of the query stored in query storage 212, one query to add StartDates and another query to add StopDates similar to Queries 4a and 4b for each such referenced table are added by set table creator 230.

Set table creator 230 generates queries to add to table Td the endpoints of the period of applicability as follows:
INSERT INTO Td VALUES ('01-JAN-96'); (Query 4c)
INSERT INTO Td VALUES ('01-JAN-97'); (Query 4d)

Each of queries 4c and 4d are created by providing the queries as shown with the endpoints of the period of applicability of the query stored in query storage 212 substituted in place of "01-Jan-96" and "01-Jan-97".

Set table creator 230 transmits to assembler 260 queries 4a–4d and the other queries corresponding to StartDates and StopDates of other referenced tables as described above.

As described above with respect to Queries 2a–2d, less than four union selects could have been used in place of the four queries 4a–4d to reduce or eliminate duplicates in table Td. Alternatively, an optional set table optimizer 232 may be used to reduce or eliminate duplicates similar to the where table optimizer 222 described above.

Set table optimizer 232 is an optional portion of the apparatus and serves to generate a query that, when executed by database product 210, will eliminate duplicate entries in table Td and may also sort the result, and operates similar to where table optimizer 222. Set table optimizer 232 creates the following query:
CREATE TABLE Td2 (This DATE);
NSERT INTO Td2
    SELECT DISTINCT * FROM Td (Query 5a)

Set table optimizer passes this query to assembler 260.

In response to the signal from query router 214, set constant set builder 234 builds a constant set of the tables referenced in the SET clause of the query stored in query storage 212, either using the Td2 table or by creating a new table. Using the Td2 table, set constant set builder builds the following query:
CREATE TABLE Te(StartDate DATE, StopDate DATE);
INSERT INTO Te
SELECT T1.This, T2.This
FROM Td2 T1, Td2 T2
WHERE T1.This < T2.This
    AND NOT EXISTS (SELECT * FROM Td2 T3
        WHERE T1.This < T3.This AND T3.This < T2.This);
        (Query 5b)

Set constant set builder 234 sends Query 5b to assembler 260.

Because the queries 3a, 3b, 5a, and 5b can be the same for any query stored in query storage 212, these queries may be stored and provided by where table optimizer 222, where constant set builder 224, set table optimizer 232 and set constant set builder 234 instead of being created each time.

E. Creating the Cursor

In response to the signal from query router 214, cursor creator 240 retrieves the query stored in query storage 212 and provides a SQL program element that creates a table having the columns listed in the SET clause of the query stored in query storage 212 and a StartDate and a StopDate using the following SQL statement:
CREATE TABLE Tg (PCN NUMBER, StartDate DATE, StopDate DATE); (SQL Prog. Element 6)

As used herein, a program element is one or more commands containing a query or SQL program code or other similar command. Table Tg will be used to hold a single row of the table to be updated in the query stored in query storage 212 as described below. A single row of that table may be stored in table Tg as a single row, or prior to storage in table Tg, may be split into several rows and stored in table Tg as several rows as described in more detail below.

Cursor creator 240 creates a cursor using the WHERE clause of the query stored in query storage 212 and adding an additional limitation to the IN and an additional limitation to the WHERE clause. The limitation to the IN ensures all tables referenced in the WHERE clause of the query stored in query storage 212 have a StartDate that is before the StopDate of the current row of the table being updated and a StopDate after the StartDate of the current row of the table being updated. The limitation to the WHERE requires the effective dates of any row added to the cursor to be at least partially within the period of applicability. For example, in response to reading Query 1, cursor creator 240 builds the following statement:
DECLARE
CURSOR IC IS SELECT * FROM Incumbents I
WHERE SSN IN (SELECT SSN FROM Employees E
    WHERE B='B' AND E.G=I.G
AND E.StartDate < I.StopDate AND I.StartDate < E.StopDate)
AND I.StartDate < '01-JAN-97' AND '01-JAN-96' < I.StopDate
FOR UPDATE OF PCN;
    ICrow IC%rowtype; (SQL Prog. Element 7)

Cursor creator creates SQL program element 7 as follows: The first two lines are provided as shown, with "Incumbents I" replaced with the name and alias of the table to be updated in the query stored in query storage 212. Lines 3 and 4 are copied from the fourth portion of the query stored in query storage 212. Line 5 is provided as shown with "E" replaced with the name of a table other than the table to be updated referenced in the fourth portion of the query stored in query storage 212. If multiple tables are so referenced, an additional line is provided within the parenthesis for each additional table so referenced with the name of the referenced table substituted for "E" in that line.

Lines 5 and 6 are provided as shown with the exceptions noted herein. "I" in lines 5 (and any additional line or lines similar to line 5 created for additional referenced tables) and 6 are replaced with the name of the table to be updated in the query stored in query storage 212. The end of the period of applicability of the query stored in query storage 212 is substituted for "01-Jan-97" and the beginning of the period of applicability of the query stored in query storage 212 is substituted for "01-Jan-96".

Line 7 is provided as shown with the name of the column to be updated substituted for "PCN". Line 8 is provided as shown.

Cursor creator 240 also creates an SQL program element defining an additional cursor for use as described below using the following program element statements:
CURSOR GC IS
SELECT * FROM Tg
ORDER BY StartDate;
    GCrow GC%rowtype;
oldPCN NUMBER; (SQL Prog. Element 8)

All lines in SQL Program Element 8 are provided by cursor creator 240 as shown except that the name of the column updated is substituted for "PCN" in the last line. If multiple columns are to be set, the last line of SQL Program Element 8 is duplicated once for each such column and added to the end of SQL Program Element 8, with the name of one additional column substituted for "PCN" on that line.

Next cursor creator 240 provides an SQL program element that declares variables for a StartDate, StopDate and an additional variable for each column to be set in the set clause of the query stored in query storage 212, and starts a loop:
oldStartDate DATE;
oldStopDate DATE;
multiple NUMBER;
BEGIN
<<ICrowloop>> FOR ICrow IN IC LOOP (SQL Prog. Element 8)
All lines in SQL Program Element 8 are provided as shown.

F. Split Rows and Copy values not to be Updated into Tg

The loop at the last line of SQL Program element 8 will allow all rows of the table being updated in the query stored in query storage 212 that: 1) meet the criteria of the fourth portion of such query, 2) have at least some overlap during the effective period of the row and the effective period of the rows of the table referenced in the fourth portion of the query stored in query storage 212, and 3) have an effective period that is at least partially within the period of applicability to be processed one row at a time.

Processing of each row of the table to be updated in the query stored in query storage 212 and that meet the three criteria described above is performed as follows when the SQL program elements described below are executed by database product 210: table Tg is used to hold one row of the table to be updated in the query stored in query storage 212. Rows that have an effective period that is fully within the period of applicability are copied into a single row of table Tg. If a portion of the effective period of the row is before the period of applicability of the query stored in query storage 212, that portion is split off and placed into an additional row of table Tg. If a portion of the effective period of the row is after the period of applicability of the query stored in query storage 212, that portion is split off and placed into an additional row of table Tg. The portion of the row within the period of applicability is set according to the third portion of the query stored in query storage 212. If possible, rows split into multiple rows are combined back into a single row equivalent. The rows from table Tg are then inserted into the table to be updated in the query stored in query storage 212, replacing the original row from that table, and the apparatus selects the next row of such table to process as described above until no more rows in the table meet the three criteria described above.

If the current row held in ICRow has an effective date that begins before the beginning of the period of applicability, the SQL Program Element created by set columns before retainer 244 splits the row into a component before the beginning of the period of applicability. Set columns before retainer 244 reads the query stored in query storage 212 and creates a program element that copies from the cursor ICRow the values of the columns that are set in the SET clause of the query stored in query storage 212 if the cursor has a StartDate prior to the period of validity and also retains the StartDate of those rows. The columns are stored by set columns before retainer 244 in table Tg created above. For example, for Query 1, set columns before retainer 244 would create an SQL Program Element as follows:
IF ICrow.StartDate < '01-JAN-96'
THEN
    INSERT INTO Tg
    VALUES (ICrow.PCN, ICrow.StartDate, '01-JAN-96');
END IF; (SQL Prog. Element 9a)

In response to the signal from query router 214, set columns before retainer 244 provides SQL Program Element 9a as shown above, substituting the name of the column being changed in the query stored in query storage 212 in place of PCN in line 4 of SQL Program Element 9a, and the beginning of the period of applicability in place of "Jan. 1, 1996" in lines 1 and 4.

If the current row held in ICRow has an effective period that ends after the end of the period of applicability, the SQL Program Element created by set columns after retainer 246 splits the row into a component after the end of the period of applicability. In response to the signal from query router 214, set columns after retainer 246 reads the query stored in query storage 212 and creates a program element that, when executed by database product 210, will copy to table Tg from the cursor ICRow the values of the columns that are set in the SET clause of the query stored in query storage 212 if the cursor has a StartDate after the end of the period of validity, and also retains the StopDate of the row. For example, for Query 1, set columns after retainer 246 would create an SQL Program Element as follows:
IF ICrow.StopDate > '01-JAN-97'
THEN
    INSERT INTO Tg
    VALUES (ICrow.PCN, '01-JAN-97', ICrow.StopDate);
END IF; (SQL Prog. Element 9b)

For queries other than Query 1, set columns after retainer 246 provides SQL Program Element 9b as shown above, substituting the name of the column being changed in the query stored in query storage 212 in place of PCN in line 4 of SQL Program Element 9b, and the end of the period of applicability in place of "Jan. 1, 1997" in lines 1 and 4.

In response to the signal from query router 214, a where predicate false values retainer 248 reads the query in query storage 312 and creates a program element that, when executed by database product 210, copies from the table being updated into table Tg the values of the columns that are set in the SET clause of the query stored in query storage 212 for rows that correspond to a false WHERE predicate in the query stored in query storage 212 for the intersection of the effective period of the current row in the table to be updated with table Tb. Each row of table Tb contains a StartDate and StopDate that defines a period (referred to as a "where constant period") over which the fourth portion of the query stored in query storage 212 is true, and no changes occur in any of the tables referenced in such portion or the table to be updated, and is limited to the period of applicability. Thus, any row in the table to be updated that fully spans a where constant period in which the fourth portion of the query stored in query storage 212 is false is not to be updated for rows of the other tables referenced that have an effective date that falls within the same constant period. Because where constant periods were defined to include the table being updated, the effective period of the ICRow object will coincide with a StartDate and a StopDate of at least one row of table Tb.

The StartDate and StopDates from the row of Tb are copied into Tg with the field being set from ICRow. In one embodiment, where predicate false values retainer 248 provides the following SQL program element in response to Query 1:
INSERT INTO Tg
SELECT ICrow.PCN, Tb.StartDate, Tb.StopDate
FROM Tb
WHERE ICrow.StartDate <=Tb.StartDate AND Tb.Stop-Date <=

ICrow.StopDate
  AND NOT (ICrow.SSN IN (SELECT SSN FROM
    Employees E
    WHERE B='B' AND E.G=ICrow.G
    AND E.StartDate < Tb.StopDate
    AND Tb.StartDate < E.StopDate));
    (SQL Prog. Element 10)

Where predicate false values retainer 248 creates this SQL program element by causing lines 1 and 3 of the SQL program element it builds to read "INSERT INTO Tg" and "FROM Tb" respectively. Where predicate false values retainer 248 creates line 2 of the SQL program element by creating a line starting with the word "SELECT", adding the name of the columns to be set from the SET clause of the query stored in query storage 212 as objects of ICRow and adding the words,"Tb.StartDate, Tb.StopDate". Where predicate false values retainer 248 builds the where clause at the end of the SQL program element by building the lines "WHERE ICrow.StartDate <=Tb.StartDate AND Tb.StopDate <=ICrow.StopDate AND NOT (ICrow." and adding the remainder of the WHERE clause from the query stored in query storage 212 with the name of the table to be updated replaced with "ICRow". Additionally, to any IN predicate is added the last two lines to ensure the StartDate of the current row of the table referenced in the IN predicate is prior to the StopDate of the current row of the Tb table and the StartDate of the current row of the Tb table is prior to the StopDate of the current row of the table referenced in the IN Predicate.

In response to the signal from query router 214, a set false values retainer 250 reads the query stored in query storage 212 and creates a program element that, when executed by database product 210, copies from the table being updated into table Tg the values of the columns for the table being updated intersect Tg intersect Te during which the WHERE clause in the query stored in query storage 212 is true but the SET clause in the query stored in query storage 212 is false.

For Query 1, set false values retainer 250 creates the following SQL Program Element:
INSERT INTO Tg
SELECT ICrow.PCN,
  GREATEST(Tb.StartDate, Te.StartDate),
  LEAST(Tb.StopDate, Te.StopDate)
FROM Tb, Te
WHERE GREATEST(ICrow.StartDate, Tb.StartDate, Te.StartDate) < LEAST(ICrow.StopDate, Tb.StopDate, Te.StopDate)
  AND ICrow.SSN IN (SELECT SSN FROM Employees E
    WHERE B='B' AND E.G=ICrow.G
    AND E.StartDate < Tb.StopDate
    AND Tb.StartDate < E.StopDate)
  AND NOT EXISTS (SELECT PCN FROM Positions P
    WHERE P.JTC='C' AND P.D=ICrow.D
    AND P.StartDate < Te.StopDate
    AND Te.StartDate < P.StopDate); (PL / SQL Program Element 11)

In one embodiment, set false values retainer 250 creates SQL Program Element 11 as follows: Line 1 of SQL Program Element 11 is provided as shown, the beginning of line 2 of SQL Program Element 11 is provided as shown above, and to the end of line 2 are appended the names of all columns to be set from the SET clause of the query stored in query storage 212 as objects of ICRow. Lines 3–7 in SQL Program Element 11 are provided as shown above. Lines 8 and 9 are created by adding the "AND" in line 8 to the WHERE clause of the query stored in query storage 212 with "ICRow" substituted for the name of the table being updated, and adding lines to ensure the current row of any tables referenced in the "IN" predicate of the WHERE clause in the query stored in query storage 212 are such that its StartDate is prior to the StopDate of the current row of table Tb and its StopDate is after the StartDate of the current row of table Tb. The next two lines, beginning with "AND NOT EXISTS . . . " are provided with the beginning as shown and completed using the predicate of the SET clause from the query stored in query storage 212 with the name of the table to be changed replaced by "ICRow". The last two lines are provided as shown with the name of the table selected from the two lines above the last two lines inserted in place of 'P'. If there are multiple SET clauses in the query stored in query storage 212, an open parenthesis, '(' , is added after the 'AND' in line 12, and the remainder of the last four lines, beginning with "NOT EXISTS" are duplicated, once for each set clause, with an 'OR' inserted between each duplicated set of four lines. A close parenthesis, ')' is added to the end of the last line of the last duplicated set of four lines. Thus, the syntax is "AND (NOT EXISTS ( . . . ) OR NOT EXISTS ( . . . ) OR . . . )".

G. Setting new Values.

In response to the signal from query router 214, a values setter 252 reads the query in query storage 212 and builds an SQL Program Element that, when executed by database product 210, inserts into Tg rows that meet the criteria of the WHERE clause and have a value for the SET clause, for the query stored in query storage 212, along with the values of the column or column to be updated, and the StartDate and StopDates for those rows. The criteria are met during ICRow intersect Tb intersect Te. For Query 1, values setter 252 generates the following SQL Program Element:
INSERT INTO Tg
SELECT P.PCN,
  GREATEST(Tb.StartDate, Te.StartDate),
  LEAST(Tb.StopDate, Te.StopDate)
FROM Tb, Te, Positions P
WHERE GREATEST(ICrow.StartDate, Tb.StartDate, Te.StartDate) < LEAST(ICrow.StopDate, Tb.StopDate, Te.StopDate)
  AND ICrow.SSN IN (SELECT SSN FROM Employees E
    WHERE B='B' AND E.G=ICrow.G
    AND E.StartDate < Tb.StopDate
    AND Tb.StartDate < E.StopDate)
  AND P.StartDate < Te.StopDate
  AND Te.StartDate < P.StopDate
  AND P.JTC='C' AND P.D=ICrow.D; (SQL Program Element 12)

Values setter 252 creates SQL program element 12 as follows: values setter 252 provides the first line as shown above. The second line is built using a select statement with the alias of the table specified in the select predicate of the SET clause of the query stored in query storage 212 and the name of the column in the SELECT predicate of the SET clause of the query stored in query storage 212 as an object of this table. The third and fourth lines of SQL Program Element 12 are provided as shown. Line 5 is created by providing "FROM Tb, Te," and inserting the table name and alias for each column selected in the SELECT predicate of the SET clause of the query stored in query storage 212. The next two lines are provided as shown. The next two lines are formed using the WHERE clause of the query stored in query storage 212, and replacing 'WHERE' with 'AND' and the name of the table to be updated with 'ICRow' . The next pair of lines are provided as shown for each table referenced in the WHERE clause of the query stored in query storage 212 that is not the table being updated, with the name of such table substituted in place of 'E' for each pair provided, with the close parenthesis ')' after the end of the last pair. The next pair of lines is provided once for each table referenced in the SET clause that is not the table being changed, with the name of such table substituted in place of 'P' for each pair of lines so provided. The last line is copied from the WHERE predicate of the SET clause of the query stored in query storage 212 with 'AND' substituted in place of 'WHERE' and 'ICrow' substituted in place of the name of the table being updated.

H. Normalizing Values.

Table Tg will have no rows that overlap in time, and all rows will be contiguous in time. It is possible that some of the rows will have the same value of the column or columns to be set in the query stored in query storage 212. In such case, such rows may be combined to reduce the number of rows to be inserted into the table being updated. Optional Tg normalizer 254 reads the query stored in query storage 212 and creates an SQL program element that combines these rows. For Query 1, Tg normalizer 254 builds the following program element:

multiple :=0;
OPEN GC;-- Tg now available
FETCH GC INTO GCrow;
IF GC%notfound
THEN GOTO endinner;-- this IC need not be updated
END IF;
oldStartDate :=GCrow.StartDate;
oldStopDate :=GCrow.StopDate;
oldPCN :=GCrow.PCN;
LOOP
FETCH GC INTO GCrow;
IF GC%notfound
THEN EXIT;
END IF;
IF oldPCN=GCrow.PCN
THEN
   oldStopDate :=GCrow.StopDate; -- rows will meet
ELSE
   INSERT INTO Incumbents
   VALUES (ICrow.SSN, oldPCN, ICrow.G, ICrow.D, ICrow.E,
   oldStartDate, oldStopDate);
   multiple :=1;
   oldStartDate GCrow.StartDate;
   oldStopDate :=GCrow.StopDate;
   oldPCN :=GCrow.PCN;
END IF;
END LOOP;-- GCrow (SQL Program Element 13)

When executed by database product 210, SQL Program Element 13 consolidates consecutive rows of table Tg that have the same value of all of the columns to be set in the query stored in query storage 212. Because table Tg was built to ensure that consecutive rows do not have overlapping times or gaps between the StopDate of one row and the StartDate of the next row, after verifying that any rows at all exist in table Tg, consolidation is reduced to checking whether the value of each column being set in the SET clause of the query stored in query storage 212 in a row of table Tg is the same as that of the prior row, the rows having been placed in date order in SQL Program Element 8. All consolidated rows of table Tg except for the last row are inserted into the table being updated by SQL Query 13. The last row is handled as described below.

Tg Normalizer 254 creates SQL Program Element 13 as follows: Lines 1–8 are provided as shown. These lines open the cursor, initialize a variable, "multiple", and fetch the first row of table Tg, skipping the process if Table Tg is empty. The StartDate and StopDates of the row are stored into variables, "oldStartDate" and "oldStopDate". Line 9 is provided using the name of the column to be set from the query stored in query storage 212 in place of "PCN". If multiple columns are to be set in the query stored in query storage 212, duplicate copies of line 9 are provided underneath line 9, with each copy using the name of a different column to be set.

Lines 10–14 are provided as shown, which start a loop which fetches subsequent rows of table Tg, one row at a time, testing to see if a subsequent row is fetched, and exiting the loop if no such subsequent row exists. Line 15 is provided as shown with "PCN" replaced by the name of the column to be set from the query stored in query storage 212. If multiple columns are to be set in such query, an equality condition for each such column is "ANDed" to line 15. (e.g. "If ((oldPCN=GCRow.PCN) AND (oldSECONDROWNAME= GCRow.SECONDROWNAME))"). Lines 16–18 are provided as shown, with lines 16 and 17 advancing the oldStopDate variable to the StopDate of the current row of Tg if all fields to be set in the query stored in query storage 212 in the current row of Tg match the same fields in the prior row of Tg. Line 18 starts the "Else" condition to be performed if no such match occurs.

Line 19 specifies insertion, with the name of the table being updated in the query stored in query storage 212 inserted in place of "Incumbents". Lines 20–21 are built by providing the names of all columns to be set in the query stored in query storage 212 using the "oldX" variables, where X is the column names (e.g. "oldPCN"), providing oldStartDate and oldStopDate, and providing the remaining column names of Tg as objects of ICRow.

Lines 22–24 are provided as shown, which identify using the "multiple" variable that Tg rows have been combined as described above (i.e. "normalized") and sets the oldStartDate and oldStopDate equal to the StartDate and StopDate, respectively, of the current row of Tg. Line 25 stores the columns to be set in the query stored in query storage 212 of the current row of Tg into "oldX" variables as described above. If multiple columns are to be set in the query stored in query storage 212, duplicates of line 25 are placed underneath line 25 with the name of a different column to be set in each copy substituted in place of "PCN" on both sides of the equation as shown in line 25. Lines 26 and 27 are provided as shown.

I. Replacing Values Into Table to Be Changed.

In response to the signal from query router 214, replace/update 256 reads the query stored in query storage 212 and builds an SQL program element that, when executed by database product 210, inserts into the table being updated in the query stored in query storage 212 the last row of Table Tg, consolidated as described above, into the table being updated in the query stored in query storage 212, and deletes the original row corresponding to the row inserted. If only one row exists in table Tg after normalizing as described above, any updated values of the columns being set in the query stored in query storage 212 are inserted using an update in place of the prior values for the row instead of the insert and delete described above. Additionally, the SQL program element built by replace/update 256 performs clean up operations such as closing cursors, deleting rows from table Tg for any processing of subsequent rows of the table being updated as described above, and committing the transactions performed by the SQL Program Elements described above.

In response to Query 1, replace/update 256 builds the following program element:
IF multiple=1
THEN
   DELETE Incumbents WHERE CURRENT OF IC;
   INSERT INTO Incumbents
   VALUES (ICrow.SSN, oldPCN, ICrow.G, ICrow.D, ICrow.E,
   oldStartDate, oldStopDate);
ELSIF oldPCN <> ICrow.PCN
THEN
   UPDATE Incumbents
   SET PCN=oldPCN
   WHERE CURRENT OF IC;
END IF;
DELETE FROM Tg;
<<endinner>>
CLOSE GC;
END LOOP ICrowloop;
<<endloop>>
COMMIT;
END; (SQL Program Element 14)

Replace/update 256 reads the query stored in query storage 212 and builds SQL program element 14 by providing it as shown above with the following exceptions: In line 4, "Incumbents" is replaced with the name of the table to be changed. In lines 5 and 6, a name corresponding to each column in the table being changed is inserted between the parentheses. The name inserted in between the parentheses for columns in the table being changed that are being updated in the SET clause of the query stored in query storage 212 use the "old" version of the name (e.g. because the PCN column is being set in Query 1, OldPCN is used in place of PCN). The name inserted between the parentheses for other columns except for the StartDate and StopDate columns use the "ICRow" object version (e.g. if the other column names in the Incumbents table are SSN, G, D, E, StartDate and StopDate, the corresponding names are ICRow.SSN, ICRow.G, ICRow.D and ICRow.E as shown in SQL Program Element 14). The oldStartDate and OldStop-Date names are used in place of the StartDate and Stopdate of the table being updated as shown in SQL Program Element 14. These names are placed in the order corresponding to the names of the columns in the table being changed. In Line 7, the name of the column being changed in the SET clause of the query stored in query storage 212 is substituted for "PCN" on both sides of the inequality operator. if multiple columns are being set, the "oldPCN <> ICRow.PCN" is "or-ed" with a similar condition using the name of the other column or columns. For example, if PCN, PCN1 and PCN2 were in the set clause of query 1, line 7 would read "ELSIF oldPCN <> ICRow.PCN OR oldPCN1 <> ICRow.PCN1 OR oldPCN2 <> ICRow.PCN2" The name of the table to be changed is substituted in place of "Incumbents" in line 9, and the name of the column to be changed that is listed in the SET clause of the query stored in query storage 212 is substituted in place of "PCN" in both placed of line 10. If additional columns are changed in the query stored in query storage 212, a copy of line 9 is placed under line 9 for each such column with a different one of the other column names being changed substituted in place of "PCN" in each of the copies of line 9.

I. Assembling the SOL Program.

When signaled by query router 214, each of the where table creator 220, where table optimizer 222, where constant set builder 224, set table creator 230, set table optimizer 232, set constant set builder 234, cursor creator 240, set columns before retainer 244, set columns after retainer 246, where predicate false values retainer 248, set false values retainer 250, values setter 252, Tg normalizer 254 and replace/update 256 produces the query or SQL Program Element described above and passes the result to assembler 260. Assembler 260 assembles the queries and SQL Program elements into a single SQL Program to be executed by database product 210, and then passes it to database product 210 for execution. In one embodiment, the Queries and SQL Program Elements described above are assembled into the program in the order in which they are described above, although other orders may be used as long as tables created are created before they a re used. Assembler 260 can submit to database product 210 the program in multiple pieces. In another embodiment, assembler 260 is not used, and query router 214 signals each of the where table creator 220, where table optimizer 222, where constant set builder 224, set table creator 230, set table optimizer 232, set constant set builder 234, cursor creator 240, set columns before retainer 244, set columns after retainer 246, where predicate false values retainer 248, set false values retainer 250, values setter 252, Tg normalizer 254 and replace/update 256 in the sequence described above. Each of these inserts the Query or Program Element it builds into a program object and passes the object to the next of these in the sequence, with the last of these submitting the program object to database product 210.

In one embodiment, assembler 260 includes into the SQL program it provides to database product 210 prior to the queries and SQL program elements it receives an SQL program element to drop all of the tables created in the queries and SQL program elements described above. Dropping tables created will make sure that old values inserted from prior queries are not part of the tables created to process the present query.

J. Method.

Figure 3A:
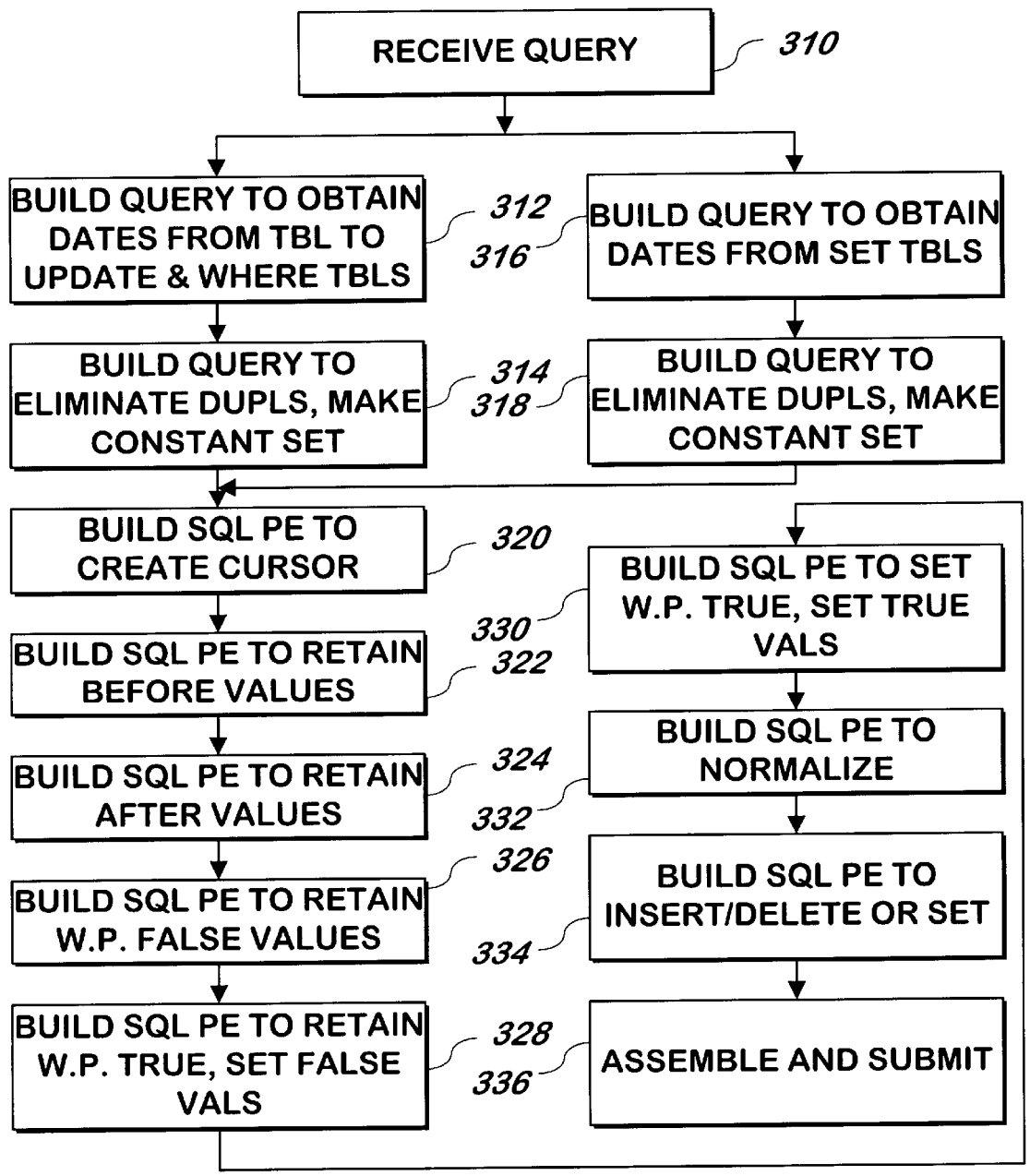
FIG. 3A is a flowchart illustrating a method of intercepting a command to change a temporal database and substituting a series of queries and SQL program elements that, when executed by a conventional database product, will perform the command according to one embodiment of the present invention.

Referring now to FIG. 3A, a method of intercepting a command to change a temporal database and substituting a series of queries and SQL program elements that, when executed by a conventional database product, will perform the command is shown according to one embodiment of the present invention. A query as described above to change a temporal database is received 310. One or more queries are built 312 that, when executed by a database product, will produce a table of StartDates and StopDates within the period of applicability for: i) the table to be changed, ii) all other tables in the where clause of the query received in step 310, and iii) the boundary dates of the period of applicability as described above with reference to the where table creator 220 of FIG. 2.

One or more queries are built 314 that, when executed by a database product optionally eliminate duplicates from the table resulting from the execution of the query built in step 312 as described above with reference to the where table optimizer 222 of FIG. 2 and/or build a constant set from the table resulting from step 312 or 314 as described above with reference to the where constant set builder 224 of FIG. 2.

One or more queries are built 316 that, when executed by a database product, create a table containing the StartDates and StopDates of the tables referenced in the set clause of the query received in step 310 meeting all of the first two, and optionally third criteria described above with reference to set table creator 230 of FIG. 2 as described above. One or more queries are optionally built 318 that, when executed by a database product, eliminates duplicates from the table that results from the table resulting from the execution of the query built in step 316, as described above with reference to the set table optimizer 232 of FIG. 2. One or more queries are built 318 that, when executed by a database product, create a constant set as described above with respect to set constant set builder 234 of FIG. 2. Steps 312 through 318 may be performed in any order, sequentially or in parallel.

One or more SQL program elements is built 320 that, when executed by a database product, create a cursor as described above with respect to cursor creator 240. One or more SQL program elements is built 322 that, when executed by a database product, retain values before the period of applicability as described above with respect to set column before retainer 244 of FIG. 2. One or more SQL program elements is built 324 that, when executed by a database product, retain the values in the table to be changed after the period of applicability as described above with respect to set columns after retainer 246 of FIG. 2. One or more SQL program elements is built 326 that, when executed by a database product, retain values in the table to be changed during the dates the where predicate is false as described above with respect to where predicate false values retainer 248 of FIG. 2. One or more SQL program elements is built 328 that, when executed by a database product, retain values in the table to be changed during periods in which the where predicate is true but the set predicate is false as described above with reference to set false values retainer 250. One or more SQL program elements are built 330 that, when executed by a database product, set new values of the table to be changed according to the set clause of the query received in step 310 as described above with respect to values setter 252. One or more SQL program elements are built 332 that, when executed by a database product, normalize the rows that will result from the queries and SQL program elements built in steps 312 through 330 into a smaller number of rows and insert all but the last row if the smaller number of rows is greater than one as described above with respect to TG normalizer 254 of FIG. 2. One or more SQL program elements are built 334 that, when executed by a database product, insert the last row from the result of step 332 into the table to be changed and delete the rows being changed if execution of the SQL Program Element created in step 332 results in more than one row, or replace the column or columns being changed for the rows being changed with the corresponding column or columns in the result of step 332 if execution of the SQL Program Element created in step 332 resulted in only one row as described above with respect to replace/update 256 of FIG. 2. Steps 312–334 are built in response to the query received in step 310 as described above.

The queries and program elements built in steps 312–334 are assembled 336 as described above with respect to assembler 260 of FIG. 2 and provided to a database product for execution. Step 336 may include inserting commands to drop tables corresponding to tables built as a result of execution of the queries and SQL program elements built in steps 312-334. The drop commands are inserted before the commands that create the tables. It isn't necessary for the queries and SQL program elements to be provided all at the same time or in the order built, as described above. The user can receive the result of the execution without knowledge of the steps 312 through 336.

K. Deletions—Apparatus.

If the query received by query router 214 is a delete query, there will be no set clause in the query. However, the VALIDTIME statement will notify query router 214 that the deletion is a sequenced deletion. In such event, query router 214 passes the query to query storage 212 and the apparatus of the present invention operates as described above with the following exceptions:

First, in response to receipt of the query, query router 214 does not signal set table creator 230, set table optimizer 232, set constant set builder 234, where predicate false values retainer 248, set false values retainer 250 and values setter 252. This means that queries 4a through 5b and SQL Program Elements 10 and 11 will not be built and will not be executed by database product 210 in order to perform the query received by query router 214.

Second, Tg normalizer 254 does not build lines corresponding to lines 9, 15–18 and 25–26 of SQL Program Element 13. Because no columns are to be set, no "OldX" variables (e.g. "OldPCN") are included in line 20 of SQL Program Element 13.

Third, replace/update 256 does not build lines corresponding to lines 7–12 of SQL Program Element 14.

To implement these changes, in one embodiment, two versions of where predicate false values retainer 248, Tg Normalizer 254 and replace/update 256 exist in the apparatus of the present invention, with query router 214 signaling one version 248, 254, 256 in response to receipt of an update statement and signaling another version (not shown) of each that operate as modified in this paragraph in response to receipt of a delete query.

In another embodiment, where predicate false values retainer 248, Tg normalizer 254 and replace/update 256 can respond as described above to either update or delete queries. Query router examines the query and notifies where predicate false values retainer 248, Tg normalizer 254 and replace/update 256 of the type of the query.

L. Deletions—Method.

Figure 3B:
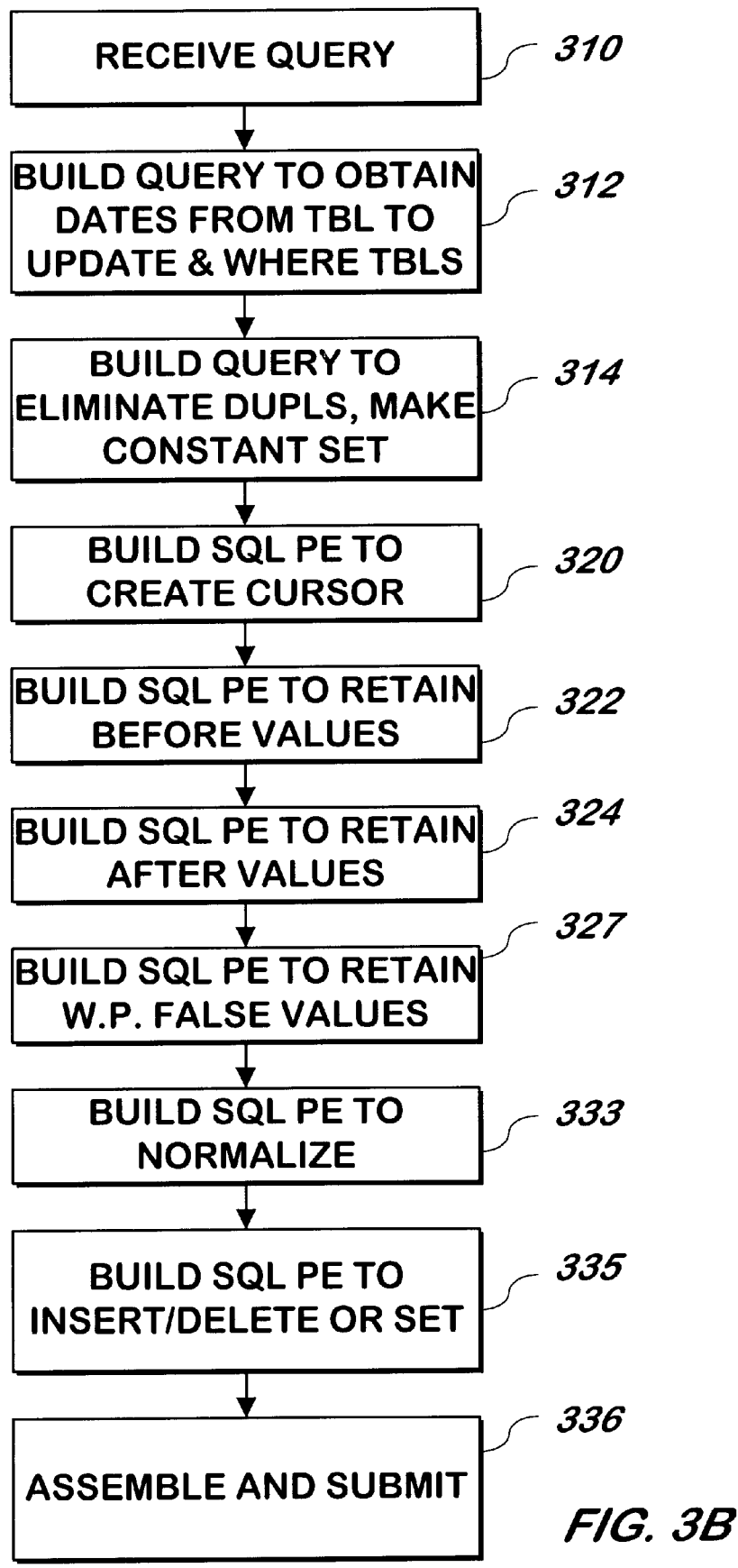
FIG. 3B is a flowchart illustrating a method of intercepting a command to delete from a temporal database and substituting a series of queries and SQL program elements that, when executed by a conventional database product, will perform the command according to one embodiment of the present invention.

Referring now to FIG. 3B, a method of intercepting a command to delete from a temporal database and substituting a series of queries and SQL program elements that, when executed by a conventional database product, will perform the command is shown according to one embodiment of the present invention. FIG. 3B is similar to FIG. 3A, except that steps 316, 318, 328, and 330 are not performed as described above with reference to delete queries, and steps 326, 332 and 334 are replaced with steps 327, 333 and 335, respectively. Steps 327, 333 and 335 operate similar to steps 326, 332 and 334, respectively, modified as described above with respect to delete queries.

Figure 3C:
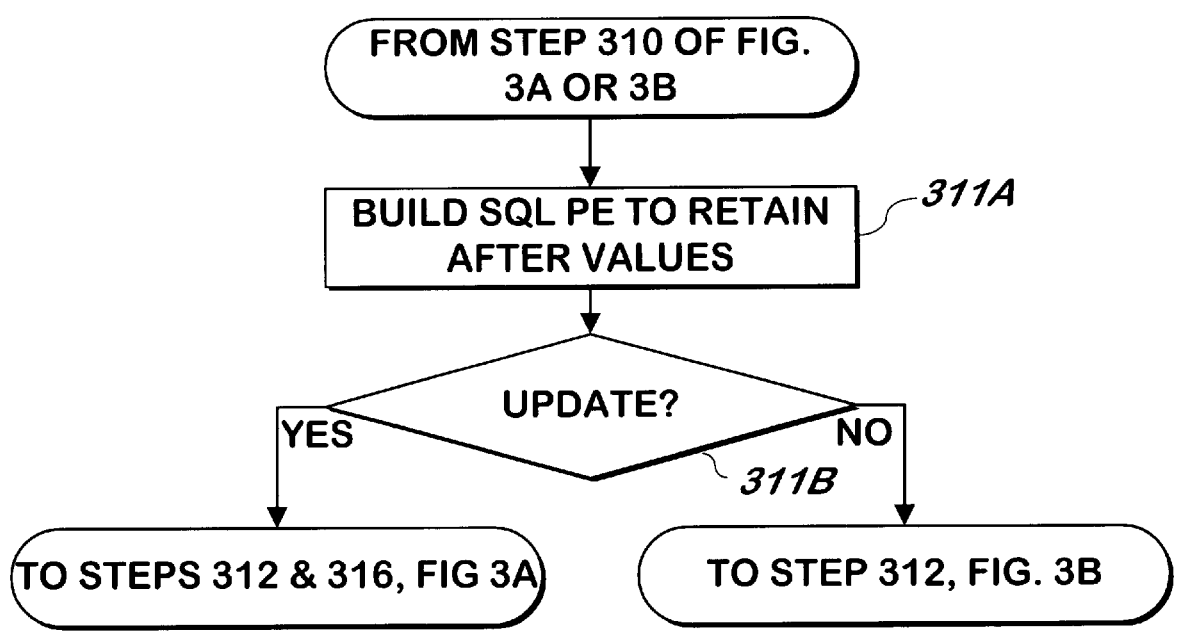
FIG. 3C is a flowchart illustrating a method of selecting between the methods of FIGS. 3A and 3B according to one embodiment of the present invention.

FIGS. 3A and 3B can be used individually, or together in conjunction with the additional steps of FIG. 3C. Referring now to FIG. 3C additional steps 311A and 311B are shown to determine whether the steps 312–336 described in FIG. 3A or 3B are to be used. Following step 310 of either FIG. 3A or 3B, the query received in step 310 may be examined 311A by looking for the word "update" or "delete" to determine whether the query is a sequenced update or a sequenced delete query. If the query is a sequenced update statement, the remaining steps 312–336 shown in FIG. 3A are performed as described above with reference to FIG. 3A, and if the query is a sequenced delete query, the steps 312–336 shown in FIG. 3B are performed as described above with reference to FIG. 3B.

What is claimed is:

1. A method in a computing system for processing a temporal row modification command against a set of rows each having an effective time interval, the method comprising:

receiving a row modification command, the command specifying a modification time interval and a modification instruction;

for each original row whose effective time interval intersects the modification time interval but is not a subset of the modification time interval, replacing the original row with a plurality of replacement rows, the plurality of replacement rows including a distinguished replacement row, the distinguished replacement row having an effective time interval that is coextensive with the intersection between the effective time interval of the original row and the modification time interval, the effective time intervals of the replacement rows collectively comprising the effective time interval of the original row, the replacement rows each having contents copied from the original row; and after the replacing, for each row whose effective time interval is a subset of the modification time interval, applying the modification instruction to the row, wherein, for distinguished replacement rows, the modification instruction is applied to the contents of the replacement rows copied from their original rows.

2. The method of claim 1 wherein the plurality of replacement rows with which original rows are replaced include a plurality of distinguished replacement rows, each of the distinguished replacement rows having an effective time interval that is coextensive with the intersection between the effective time interval of the original row and the modification time interval.

3. The method of claim 1 wherein the row modification command specifies a plurality of modification time intervals, and wherein the plurality of replacement rows with which original rows are replaced include a plurality of distinguished replacement rows, each of the distinguished replacement rows having an effective time interval that is coextensive with the intersection between the effective time interval of the original row and the modification time interval, the effective time intervals of at least two of the distinguished replacement rows being wholly within different modification time intervals.

4. The method of claim 1 wherein the row modification command specifies a plurality of modification time intervals, and wherein the modification instruction specified by the row modification command applies differently with respect to the different modification time intervals.

5. A computer-readable medium whose contents cause a computing system to process a row modification command against a set of rows each having an effective time period by:

receiving a row modification command, the command specifying a modification time period and a modification instruction;

for each original row whose effective time period overlaps the modification time period but is not wholly within the modification time period, replacing the original row with a plurality of replacement rows, the plurality of replacement rows including a distinguished replacement row, the distinguished replacement row having as an effective time period the period for which the effective time period of the original row overlaps the modification time period, the effective time periods of the replacement rows collectively cover the effective time period of the original row, the replacement rows each having contents copied from the original row; and after the replacing, for each row whose effective time period is wholly within the modification time period, applying the modification instruction to the row, wherein, for distinguished replacement rows, the modification instruction is applied to the contents of the replacement rows copied from their original rows.

6. A computing system for processing a temporal row modification command against a set of rows each having an effective time range, comprising:

a command receiving subsystem that receives a row modification command, the command specifying a modification time range and a modification instruction;

a row subdivision subsystem that, for each original row whose effective time range intersects the modification time range but is not a subset of the modification time range, replaces the original row with a plurality of replacement rows, the plurality of replacement rows including a distinguished replacement row whose effective time range is coextensive with the intersection between the effective time range of the original row and the modification time range, the effective time ranges of the replacement rows collectively comprising the effective time range of the original row, the replacement rows each having contents copied from the original row; and a modification instruction application subsystem that, subsequent to the operation of the row subdivision subsystem, for each row whose effective time range is a subset of the modification time range, applies the modification instruction to the row, wherein, for distinguished replacement rows, the modification instruction is applied to the contents of the replacement rows copied from their original rows.

7. One or more computer memories collectively containing a temporal row modification command, the temporal row modification command comprising:

a first indication indicating a set of rows to modify;

a second indication indicating a time period for which to modify rows in the indicated set; and a third indication indicating a manner in which to modify the rows of the indicated set, such that the indications comprising the temporal row modification command may be used to modify the indicated set of rows for the indicated time period in the indicated manner by (1) for any rows in tile indicated set having effective time periods not wholly within or without the indicated time period, splitting the row into two or more resulting rows, the effective time period of each resulting row wholly within or without the indicated time period; and (2) modifying only those rows in the indicated set whose effective time periods are wholly within the indicated time period.

8. One or more generated data signals collectively conveying a row modification command, the row modification command for execution by a computer system, the row modification command comprising:

an indication of a set of rows to modify;

an indication of a time period for which to modify rows in the indicated set; and an indication of a manner in which to modify the rows of the indicated set, such that the indications comprising the row modification command may be used by a receiver of the data signals to modify the indicated set of rows for the indicated time period in the indicated manner by (1) for any rows in the indicated set having effective time periods not wholly within or without the indicated time period, splitting the row into two or more resulting rows, the effective time period of each resulting row wholly within or without the indicated time period; and (2) modifying only those rows in the indicated set whose effective time periods are wholly within the indicated time period.

* * * * *

UNITED STATES PATENT AND TRADEMARK OFFICE
CERTIFICATE OF CORRECTION

PATENT NO.    : 6,442,543 B1
DATED         : August 27, 2002
INVENTOR(S)   : Snodgrass et al.

It is certified that error appears in the above-identified patent and that said Letters Patent is hereby corrected as shown below:

Column 9,
Line 54, delete "20";
Line 59, "able" should be -- table --;

Column 11,
Line 35, "NSERT" should be -- INSERT --;

Column 19,
Line 49, "if" should be -- If --;

Column 23,
Line 55, "cover" should be -- covering --;

Column 24,
Line 37, "tile" should be -- the --;

Signed and Sealed this

Fourth Day of February, 2003

JAMES E. ROGAN
*Director of the United States Patent and Trademark Office*